United States Patent [19]

Honjo et al.

[11] Patent Number: 5,022,908
[45] Date of Patent: Jun. 11, 1991

[54] APPARATUS FOR BENDING GLASS SHEET

[75] Inventors: Seiichiro Honjo; Yasunori Okajima, both of Osaka, Japan

[73] Assignee: Nippon Sheet Glass Co., Ltd., Osaka, Japan

[21] Appl. No.: 388,443

[22] Filed: Aug. 2, 1989

[30] Foreign Application Priority Data

Aug. 3, 1988 [JP] Japan .................. 63-102904
Aug. 3, 1988 [JP] Japan .................. 63-194043

[51] Int. Cl.⁵ .................. C03B 23/03; C03B 25/08; C03B 27/00
[52] U.S. Cl. .................. 65/268; 65/104; 65/273; 65/351
[58] Field of Search .................. 65/268, 273, 287, 289, 65/348, 351, 104

[56] References Cited

U.S. PATENT DOCUMENTS

| | | | |
|---|---|---|---|
| 3,338,695 | 8/1967 | Ritter | 65/104 |
| 3,476,540 | 11/1969 | Ritter et al. | 65/107 |
| 3,501,281 | 3/1970 | Mattimore et al. | 65/288 |
| 4,233,049 | 11/1980 | Seymour | 65/106 |
| 4,280,828 | 7/1981 | Seymour | 65/106 |
| 4,290,796 | 9/1981 | Reese et al. | 65/287 |
| 4,297,118 | 10/1981 | Kellar et al. | 65/104 |
| 4,298,368 | 11/1981 | Seymour | 65/25.2 |
| 4,349,375 | 9/1982 | Kellar et al. | 65/291 |
| 4,357,156 | 11/1982 | Seymour | 65/104 |
| 4,433,993 | 2/1984 | Frank | 65/104 |
| 4,447,252 | 5/1984 | DiNocco et al. | 65/268 |
| 4,470,835 | 9/1984 | Fecik et al. | 65/106 |
| 4,522,641 | 6/1985 | Hagedorn et al. | 65/291 |
| 4,526,605 | 7/1985 | Frank et al. | 65/273 |
| 4,575,390 | 3/1986 | McMaster | 65/273 |
| 4,578,103 | 3/1986 | Fackelman | 65/182.2 |
| 4,615,724 | 10/1986 | Fackelman | 65/182.2 |
| 4,661,139 | 4/1987 | Reese et al. | 65/106 |
| 4,666,492 | 5/1987 | Thimons et al. | 65/273 |
| 4,738,704 | 4/1988 | Vanaschen et al. | 65/106 |
| 4,859,225 | 8/1989 | Kuster et al. | 65/104 |

FOREIGN PATENT DOCUMENTS

| | | |
|---|---|---|
| 0030340 | 11/1980 | European Pat. Off. |
| 57-140325 | 8/1982 | Japan |
| 62-129033 | 8/1987 | Japan |
| 62-270429 | 11/1987 | Japan |

Primary Examiner—Joye L. Woodard
Attorney, Agent, or Firm—Lowe, Price, LeBlanc, Becker and Shur

[57] ABSTRACT

An apparatus for bending a glass sheet has a heating zone for heating the glass sheet, a shaping zone for shaping the glass sheet, and a cooling zone for cooling the glass sheet. A transfer zone for transferring the glass sheet is disposed immediately before the shaping zone with respect to the direction in which the glass sheet is fed. The glass sheet is fed through the transfer zone, the shaping zone, and the cooling zone by a ring mold mechanism which supports the glass sheet from below.

15 Claims, 5 Drawing Sheets

APPARATUS FOR BENDING GLASS SHEET

BACKGROUND OF THE INVENTION

1. Field of the Invention

The present invention relates to an apparatus for bending a glass sheet, and more particularly to an apparatus for bending a laminated glass sheet and reinforced glass sheet which will be used as window glass sheets for automobiles.

2. Description of the Relevant Art

One method for bending laminated glass sheets which will be used as automotive window glass sheets is known as a gravity bending method. According to the gravity bending method, two glass sheets are placed one on the other and bent or shaped by gravity. However, the gravity bending method has limitations as it is unable satisfactorily to shape modern automotive window glass sheets which have relatively complex and deeply curved configurations. Specifically, since the weight of glass sheets is imposed substantially uniformly over the entire surfaces thereof during the process of the gravity bending method, it is necessary to control the temperature distribution over the glass sheets accurately while bending them to a complex shape. It is however difficult and costly to control the temperature distribution over glass sheets with the presently available gravity bending technology.

Various glass sheet bending apparatus are disclosed in:

1. U.S. Pat. No. 4,290,796 patented Sept. 22, 1981;
2. Japanese Laid-Open Patent Publication No. 57-140325 published Aug. 30, 1982; and
3. U.S. Pat. No. 4,738,704 patented Apr. 19, 1988.

Apparatus for pressing a glass sheet to shape between a pair of molds without gravity bending are disclosed in:

4. U.S. Pat. No. 3,338,695 patented Aug. 29, 1967;
5. Japanese Laid-Open Utility Model Publication No. 62-129033 published Aug. 15, 1987; and
6. Japanese Laid-Open Patent Publication No. 62-270429 published Nov. 24, 1987.

According to the glass sheet bending apparatus disclosed in the publications Nos. 1 and 2 above, a lower mold carrying a glass sheet is conveyed into a heating furnace in which the glass sheet is bent by gravity and then pressed to shape by an upper mold near the exit of the heating furnace. While the glass sheet is being bent by gravity, the glass sheet tends to sag into an undesirable configuration just like the bottom of a cooking pan, for example. The glass sheet configuration thus produced cannot easily be corrected when the glass sheet is later pressed between the upper and lower molds.

The apparatus disclosed in the publication No. 3 above operates as follows: First, a glass sheet is fed into a position below an upper mold in a heating furnace, and then bent to shape by applying a hot air flow under pressure to press the glass sheet against the lower surface of the upper mold. Thereafter, the pressure of the hot air flow is lowered, and the glass sheet is attracted to the upper mold under a vacuum. According to this apparatus, the glass sheet is pressed to shape under the uniform and moderate pressure of the hot air flow. Therefore, it is difficult to bend the glass sheet into a deep and/or complex configuration.

In the apparatus shown in the publication No. 4, the upper edge of a glass sheet is gripped and suspended by tongues when it is shaped with heat. The tongues leave their marks on the upper edge of the glass sheet.

The apparatus shown in the publication No. 5 has feed rolls for feeding a glass sheet, which extend in a direction across a concave mold through respective pockets defined in the concave mold. Consequently, only a partial region of the concave mold is used to press the glass sheet to shape. If the entire region of the concave mold were employed to press the glass sheet, then the shaped glass sheet would have marks of the pockets.

In the apparatus disclosed in the publication No. 6, a glass sheet which has been fed in a horizontal condition is attracted to a convex mold under a vacuum, and is then pressed by a lower mold positioned below the glass sheet. Since the glass sheet is attracted to the convex mold against gravity, a strong vacuum must be applied to attract the glass sheet against the convex mold. The forced attraction of the glass sheet to the convex mold prior to the shaping of the glass sheet tends to cause the heat insulating cloth on the convex mold to leave its mark on the glass sheet, and also makes it difficult to separate the shaped glass sheet easily from the convex mold. If the glass sheet were not attracted positionally accurately to the convex mold, the glass sheet would not be shaped accurately to a desired configuration.

The present invention has been made in an effort to solve the various problems, as described above, of the conventional glass sheet bending apparatus.

SUMMARY OF THE INVENTION

It is an object of the present invention to provide an apparatus for bending a glass sheet accurately into a deep and complex configuration, as desired, without leaving unwanted marks on the glass sheet while employing the entire region of shaping molds.

According to the present invention, there is provided an apparatus for bending a glass sheet, comprising a heating zone for heating the glass sheet, a shaping zone for shaping the glass sheet, a cooling zone for cooling the glass sheet, a transfer zone disposed immediately before the shaping zone in a direction in which the glass sheet is fed, first feed means extending from the heating zone to the transfer zone, second feed means movable between the transfer zone, the shaping zone, and the cooling zone, the transfer zone having means for transferring the glass sheet from the first feed means to the second feed means, and the second feed means comprising ring mold means for supporting the glass sheet from below.

According to the present invention, there is also provided an apparatus for bending a glass sheet, comprising a heating furnace for heating the glass sheet, a shaping zone for bending the glass sheet, the shaping zone being disposed at a downstream end of the heating furnace with respect to a direction in which the glass sheet is fed, a transfer zone for transferring the glass sheet, the transfer zone being disposed immediately before the shaping zone, a quenching zone disposed at a downstream end of the shaping zone outside of the heating furnace, a ring mold reciprocally movable between the shaping zone, the transfer zone, and the quenching zone, and rollers disposed between the transfer zone and vertically movable between an upper position in which the rollers receive the glass sheet from feed rollers and a lower position in which the rollers transfer the glass sheet onto the ring mold.

According to the present invention, there is further provided an apparatus for bending a glass sheet, comprising a heating furnace for heating the glass sheet, a first feed mechanism for feeding the glass sheet horizontally in the heating furnace, a shaping zone for shaping the glass sheet, the shaping zone being disposed downstream of the heating furnace in a direction in which the glass sheet is fed, a transfer zone disposed immediately before the shaping zone in the heating furnace, a ring mold for receiving the glass sheet horizontally from the first feed mechanism in the transfer zone, a second feed mechanism for feeding the ring mold with the glass sheet supported thereon from the transfer zone to the shaping zone, upper and lower molds for bending the glass sheet horizontally which is supported on the ring mold, in the shaping zone, and a cooling zone for cooling the glass sheet shaped in the shaping zone, the cooling zone being disposed outside of the heating furnace contiguously to the shaping zone.

The above and further objects, details and advantage of the present invention will become apparent from the following detailed description of preferred embodiments thereof, when read in conjunction with the accompanying drawings.

DETAILED DESCRIPTION OF THE PREFERRED EMBODIMENTS

Figure 1:
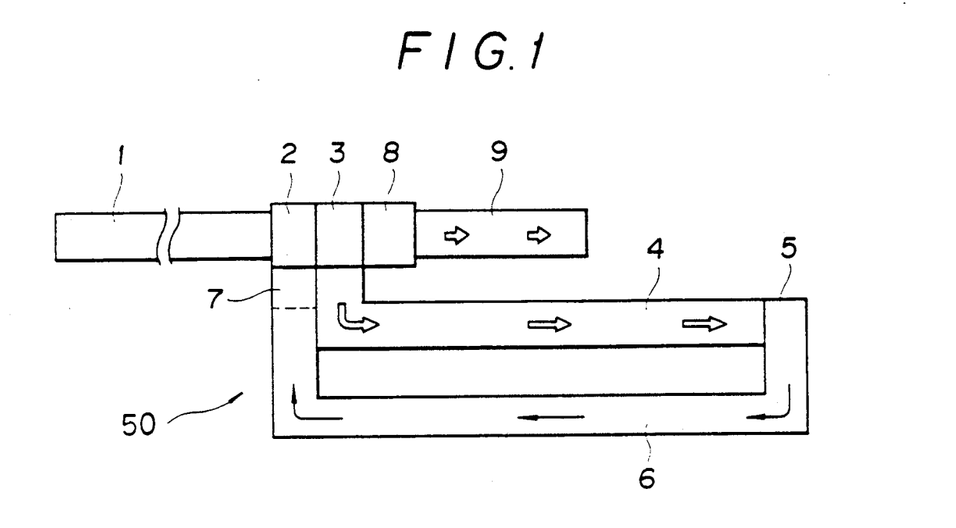
FIG. 1 is a schematic plan view of a glass sheet bending apparatus according to the present invention.

As shown in FIG. 1, a glass sheet bending apparatus 50 according to the present invention has a heating furnace 1 with a shaping zone 3 at its downstream end. A transfer zone 2 is disposed in the heating furnace 1 immediately in front of the shaping zone 3. The shaping zone 3 shapes two glass sheets as described later on. From the shaping zone 3, there extends a lehr 4 for annealing a laminated glass sheet thus shaped, in a direction laterally out of the heating furnace 1 and normal to the longitudinal direction thereof. The lehr 4 has a downstream end connected to the transfer zone 2 through a ring mode return passage 6. The return passage 6 has an upstream end which immediately follows the downstream end of the lehr 4 and serves as a pickup station 5 for picking up the annealed glass sheet. The ring mold return passage 6 has a downstream end which is positioned adjacent to the transfer zone 2 and serves as a preheating chamber 7 for heating a ring mold 14 (FIGS. 2A through 2D) up to a predetermined temperature. Primary and secondary cooling zones 8, 9 extend from the shaping zone 3 out of the heating furnace 1. As described later on, the cooling zones 8, 9 are used to manufacture tempered glass sheets. The glass sheet bending apparatus 50 is constructed of the heating furnace 1, the lehr 4, the ring mode return passage 6, and the cooling zones 8, 9.

Figure 2A:
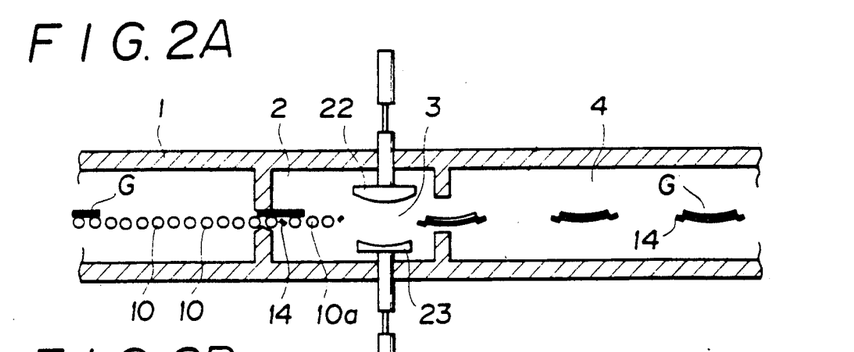
FIGS. 2A through 2D are fragmentary cross-sectional views showing progressive steps of bending a laminated glass sheet on the glass sheet bending apparatus of the present invention.
Figure 3:
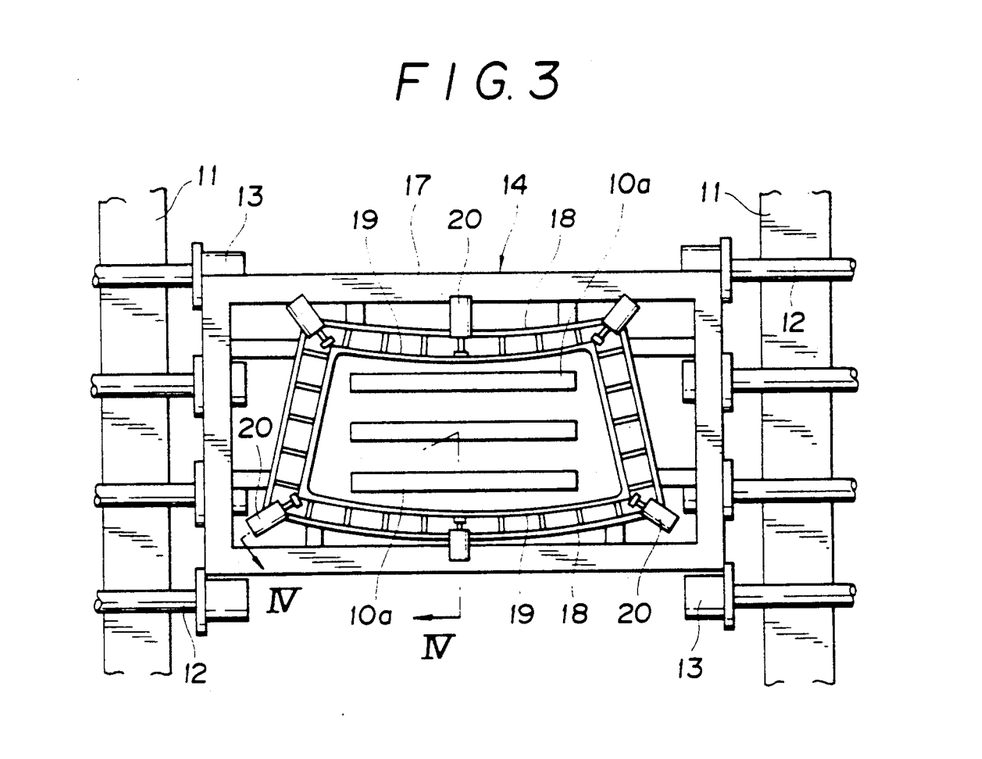
FIG. 3 is a plan view of a transfer zone in the glass sheet bending apparatus.

As shown in FIG. 2A, for example, a plurality of feed rollers 10 for feeding a pair of glass sheets G horizontally in the longitudinal direction of the heating furnace 1 are disposed in the heating furnace 1. As illustrated in FIG. 3, the heating furnace 1 has a pair of side walls 11, which define the transfer zone 2 therebetween, and rotatable drive shafts 12 are rotatably supported on the side walls 11, with rollers 13 mounted on the inner ends of the shafts 12. Similar rotatable shafts are supported on the side walls of the shapinq zone 3, the lehr 4, and the return passage 6 along the path of movement of the ring mold 14. The ring mold 14 placed on the rollers is moved from the transfer zone 2 through the shaping zone 3, the lehr 4, and the return passage 6 back to the transfer zone 2 upon rotation of the rotatable shafts.

Figure 5:
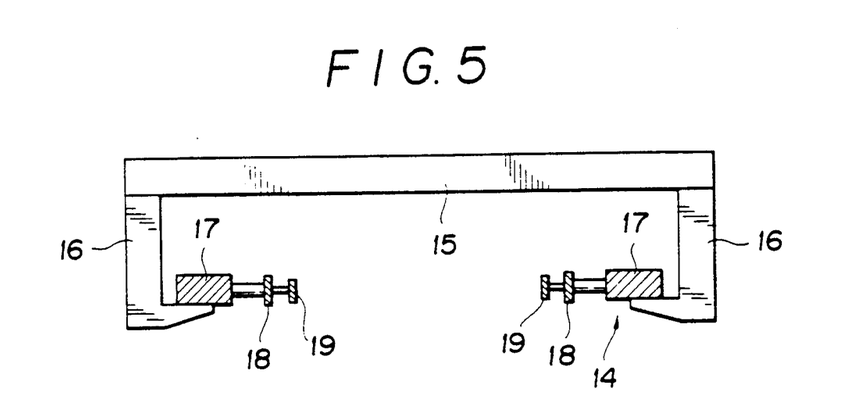
FIG. 5 is a front elevational view of a jig for carrying a ring mold into the transfer zone of FIG. 3.

A jig 15 shown in FIG. 5 is used to carry and place the ring mold 14 from the preheating chamber 7 at the downstream end of the return passage 6 onto the rollers 13 in the transfer zone 2. The jig 15 has four hooked fingers 16 for supporting an outer frame 17 of the ring mold 14 from below, thus suspending the ring mold 14. There are a plurality of ring molds 14 circulating through the zones 2, 3, the lehr 4, and the return passage 6, and supplied one at a time to the transfer zone 2.

Figure 4:
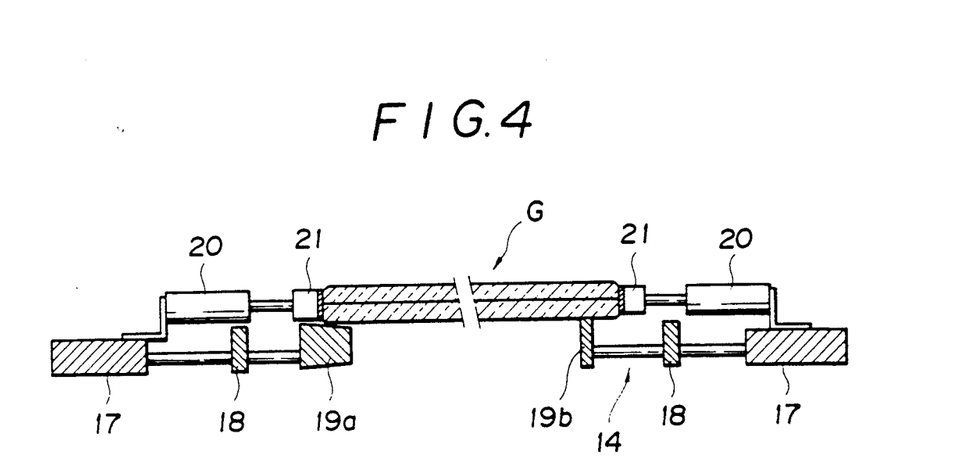
FIG. 4 is a cross-sectional view taken along line IV—IV of FIG. 3.

As shown in FIG. 4, the ring mold 14 has outer and inner rings 18, 19 disposed inwardly of the outer frame 17. In the transfer zone 2, the glass sheet pair G is transferred from the feed rollers 10 onto the inner ring 19. The inner ring 19 has wider corners 19a for supporting the corners of the glass sheet pair G, and narrower sides 19b for supporting side edges of the glass sheet pair G. Cylinder units 20 having pushers 21 for positioning the glass sheet pair G are mounted on the outer frame 17.

As shown in FIG. 3, three rollers 10a out of the feed rollers 10, which are located in the transfer zone 2, are vertically movable and dimensioned such that they are positioned within the inner ring 19. The rollers 10a receive the glass sheet pair G from the feed rollers 10 when the rollers 10a are in their elevated position, and transfer the glass sheet pair G onto the ring mold 14 when they are lowered.

The shaping zone 3 has an upper convex mold 22 and a lower concave mold 23 which are vertically movable. The glass pair G is pressed to a bent shape by the molds 22, 23.

The molds 22, 23 are made of a heat resistant material which can well be machined. More specifically, the molds 22, 23 are made of a material which can continuously withstand temperatures ranging from about 550° C. to 700° C. in the heating furnace 1, and which has such a hardness that it can be machined by a sintered carbide cutting tool under numerical control, i.e., a hardness ranging from 2 to 5 as measured by the Mohs scale. Specifically, the molds 22, 23 may be made of one of the following materials:

Aluminous cement which contains 40 wt % of $Al_2O_3$, 25 wt % of $SiO_2$, and 35 wt % of $CaO$. This material can resist more than 1000° C., and can be used stably at temperatures around 700° C. The Mohs hardness of the material ranges from 2 to 3;

Calcium silicate which is capable of resisting 1000° C. or more and can be used stably at temperatures around 700° C. The Mohs hardness of this material ranges from 3 to 4.

Fused silica which contains 99 wt % or more of $SiO_3$. The fused silica is produced by melting and then cooling silica, and sintering it at 400° C. to 800° C. so that the specific gravity thereof ranges from 1.0 to 1.9. The fused silica has a Mohs hardness in the range of from 3 to 5. While the fused silica is relatively expensive, it has a thermal coefficient of expansion ranging from $5 \times 10^{-7}$ to $6 \times 10^{-7}$ which is smaller than those of metals and other ceramic materials. Since the fused silica is subjected to small thermal deformation during usage, the shaping molds of fused silica can shape glass sheets highly accurately.

The molds 22, 23 for pressing laminated glass sheets and molds 122, 123 and 222, 223 (described later on) for pressing tempered glass sheets have curved shaping surfaces and can shape glass sheets at their softening point to which the glass sheets have been heated. Therefore, these molds can be used to shape glass sheets in the heating furnace 1 the interior of which is kept at a relatively high temperature.

Webs of woven cloth or felt (nonwoven cloth) of silica fibers, glass fibers, carbon fibers, or the like are applied to the shaping surfaces of the molds 22, 23 to prevent the glass sheet pair G from sticking to the shaping surfaces and also from developing strains. The entire upper surface region of the lower mold 23 is used as the shaping surface.

A process of successively bending a pair of glass sheets G into a laminated glass sheet, using the glass sheet bending apparatus 50, will be described with reference to FIGS. 2A through 2D.

As shown in FIG. 2A, the glass sheet pair G is fed horizontally by the feed rollers 10 to the transfer zone 2 in the heating furnace 1 until the glass sheet G are placed on the rollers 10a in alignment with the ring mold 14. At this time, the ring mold 14 has been positioned slightly lower than the rollers 10a in surrounding relationship to the rollers 10a. While the glass sheet pair G is being thus fed along, it is heated to around a glass temperature point.

Figure 2B:
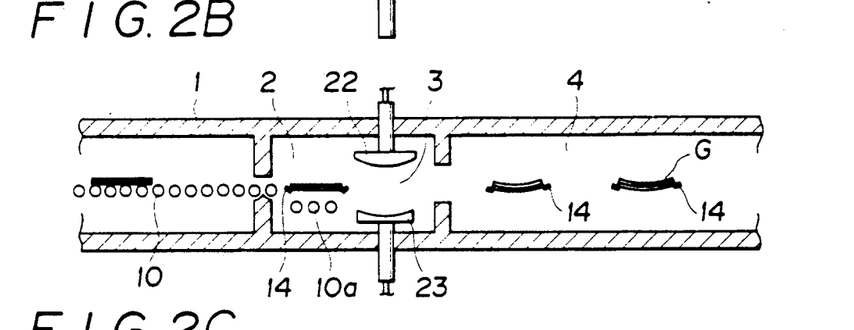

Then, as shown in FIG. 2B, the rollers 10a are lowered to place the glass sheet pair G on the inner ring 19 of the ring mold 14. Immediately thereafter, the cylinder units 20 are operated to position the glass sheet pair G.

Figure 2C:
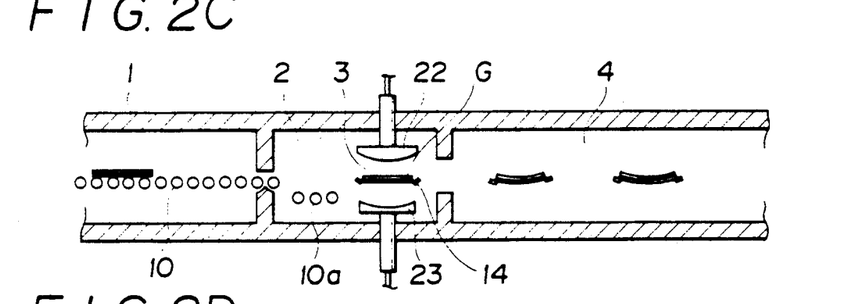
Figure 2D:
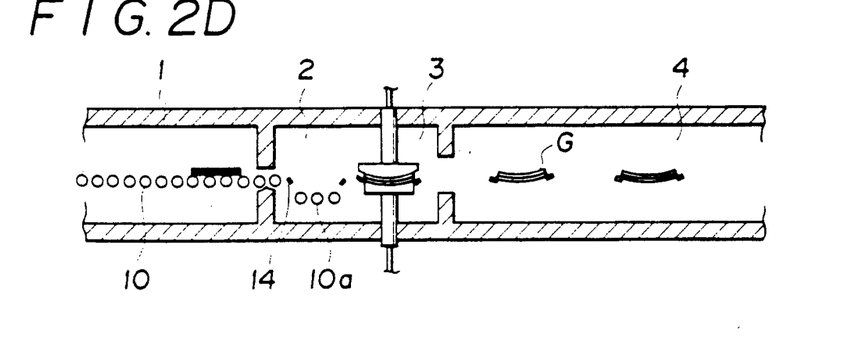

As shown in FIG. 2C, the ring mold 14 with the glass sheet pair G placed thereon is moved by the shafts 12 and the rollers 13 into the shaping zone 3 vertically between the molds 22, 23. Then, the glass sheet pair G is pressed and bent by the upper and lower molds 22, 23 as illustrated in FIGS. 2D. Immediately before the glass sheet pair G is pressed, the cylinder units 20 may be actuated again to correct the position of the glass sheet pair G.

The ring mold 14 which supports the shaped glass pair G is then moved from the shaping zone 3 into the lehr 4 by the shafts 12 and the rollers 13, until finally the ring mold 14 reaches the glass sheet pick-up station 5 at the upstream end of the ring mold return passage 6. During passage through the lehr 4, the glass sheet pair G is annealed in the lehr 4. The annealed glass sheet pair G is thereafter picked up in the pick-up station 5.

After the ring mold 14 has moved past the pick-up station 5, the ring mold 14 is conveyed through the return passage 6 to the preheating chamber 7 at the downstream end of the return passage 6. The ring mold 14 is heated to a predetermined temperature in the preheating chamber 7, and then delivered by the jig 15 into the predetermined position in the transfer zone 2 shown in FIG. 2A.

The above process is specifically addressed to the formation of a laminated glass sheet for use in an automotive window.

An arrangement for bending a tempered glass sheet for used in an automotive window, using the glass sheet bending apparatus 50, will be described below with reference to FIGS. 6A through 6F. In this process, an upper convex mold 122 and a lower concave mold 123 are employed in place of the molds 22, 23, and the cooling zones 8, 9 are put to use. The primary cooling zone 8 serves as a quenching zone.

The upper mold 122 is connected to a vacuum pump (not shown) for attracting a shaped glass sheet g to the lower shaping surface of the upper mold 122. The shaping surface of the upper mold 122 has a plurality of holes (not shown) defined therein for exerting a vacuum pressure therethrough to attract the glass sheet g. The entire upper surface region of the lower mold 123 is used as a shaping surface. A first ring mold 114a is disposed between the transfer zone 2 and the shaping zone 3 for reciprocating movement therebetween. The rollers 10a are vertically movable and dimensioned such that they are positioned within an inner ring (not shown) of the ring mold 114a. The first ring mold 114a is of a configuration shallower than the final product configuration of the glass sheet g so that the first ring mold 114a pre-shapes the glass sheet g.

The heating furnace 1 has an outlet 30 which is openable and closable by a vertically movable shutter 31. Between the shaping zone 3 and the primary cooling zone 8, there is disposed a second ring mold 114b reciprocally movable between these zones with the shutter 31 lifted. The second ring mold 114b may be moved between the shaping zone 3 and the primary cooling zone 8 by a known feed mechanism. Such a prior art feed mechanism is described in McMaster U.S. Pat. No. 4,575,390 at column 9, lines 13-44, for example and is illustrated at FIGS. 6-7 therein. The feed mechanism is shown at 32 in FIG. 6F of the present drawing Figures, and includes a conveyor and an actuator, in accordance with the description of the '390 patent. The second ring mold 114b is of a configuration identical to the final product configuration of the glass sheet g.

The primary cooling zone 8 has an upper box 33 and a lower box 34 which communicate with a source of air under pressure. Nozzles 35 are mounted on the entire lower surface region of the upper box 33 and nozzles 36 are mounted on the entire upper surface region of the lower box 34. The nozzles 35, 36 apply air under pressure to the surfaces of the shaped glass sheet g.

A process of bending a tempered glass sheet for use in an automotive window using the heating furnace 1 and the cooling zones 8, 9 will be described below. The first ring mold 114a is substantially structurally identical to the ring mold 14 shown in FIGS. 2A through 2D and 3.

Figure 6A:
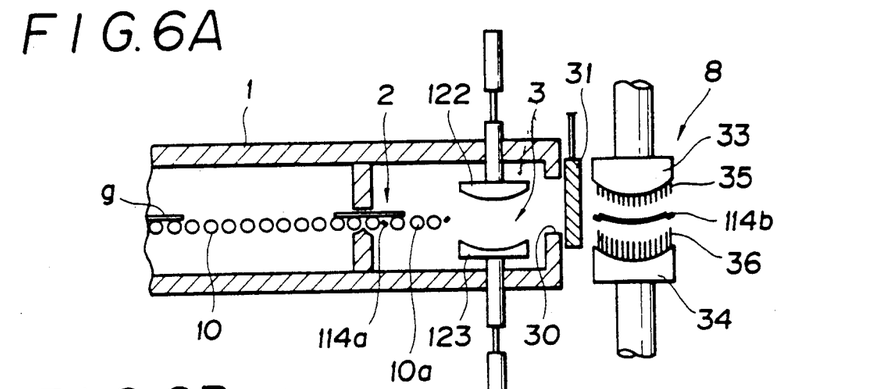
FIGS. 6A through 6F are fragmentary cross-sectional views showing progressive steps of shaping a reinforced glass sheet on the glass sheet bending apparatus of the present invention.

As shown in FIG. 6A, a single glass sheet g is fed horizontally by the feed rollers 10 to the transfer zone 2 in the heating furnace 1 until the glass sheet G are placed on the rollers 10a in alignment with the first ring mold 114a. At this time, the first ring mold 114a has been positioned slightly lower than the rollers 10a in surrounding relationship to the rollers 10a. While the glass sheet g is being thus fed along, it is heated to around a glass temperature point.

Figure 6B:
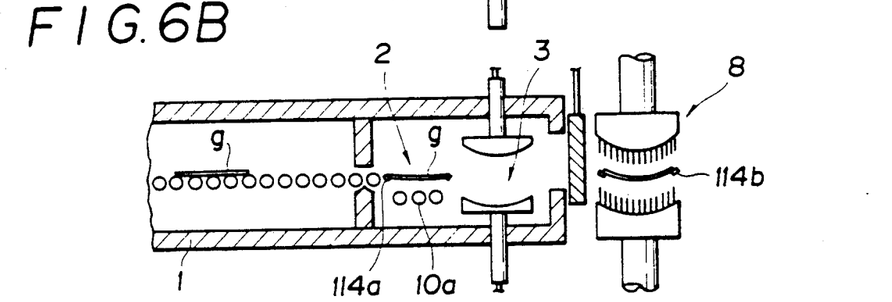

Then, as shown in FIG. 6B, the rollers 10a are lowered to pace the glass sheet g on the inner ring of the first ring mold 114a. Immediately thereafter, the cylinder units (not shown) are operated to position the glass sheet g.

Figure 6C:
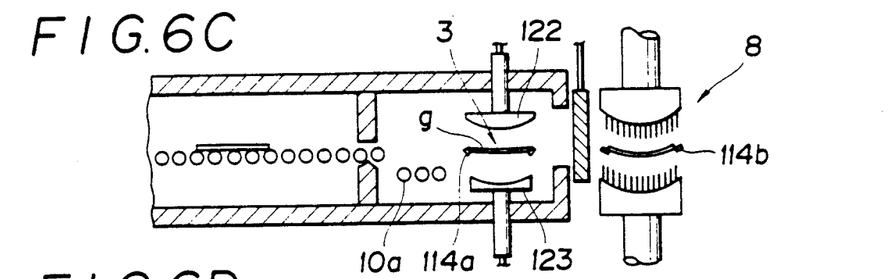
Figure 6D:
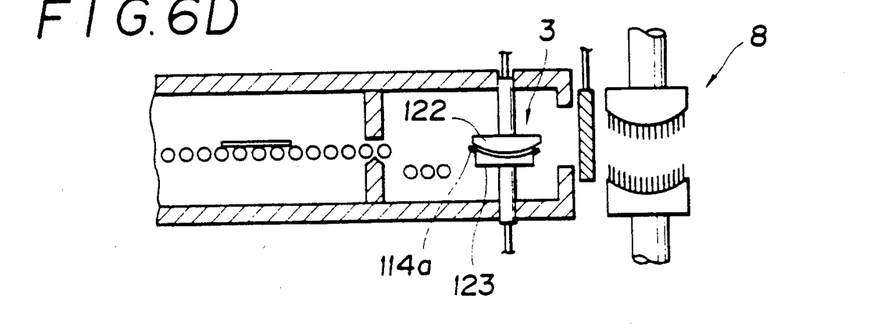

As shown in FIG. 6C, the first ring mold 114a with the glass sheet g placed thereon is moved by the shafts 12 and the rollers 13 between the upper and lower molds 122, 123. While the glass sheet g is being fed from the zone 2 to the zone 3, it is pre-shaped. As shown in FIG. 6D, the glass sheet g is pressed and bent by the upper and lower molds 122, 123 in the shaping zone 3.

Figure 6E:
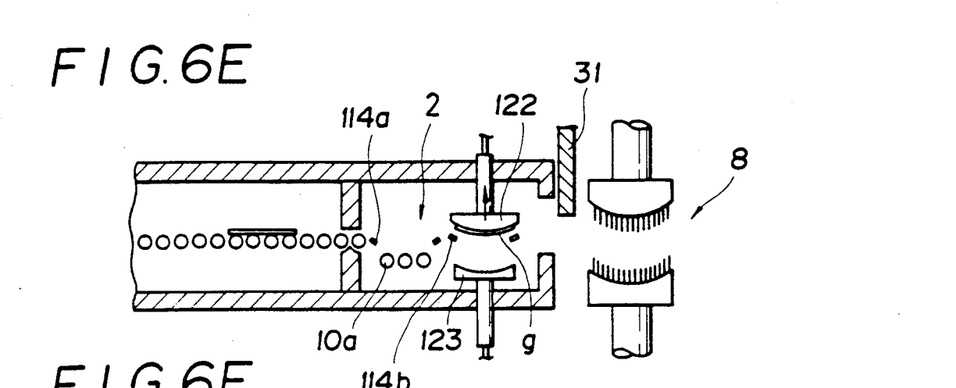

Thereafter, as shown in FIG. 6E, the shaped glass sheet g is attracted by the upper mold 122 under suction, and the upper mold 122 is lifted and the lower mold 123 is lowered Then, the first ring mold 114a is moved back into the transfer zone 2 into alignment with the rollers 10a, and at the same time the shutter 31 is temporarily opened to allow the second ring mold 114b to be moved into a position between the upper and lower molds 122, 123 by the aforementioned feed mechanism.

Figure 6F:
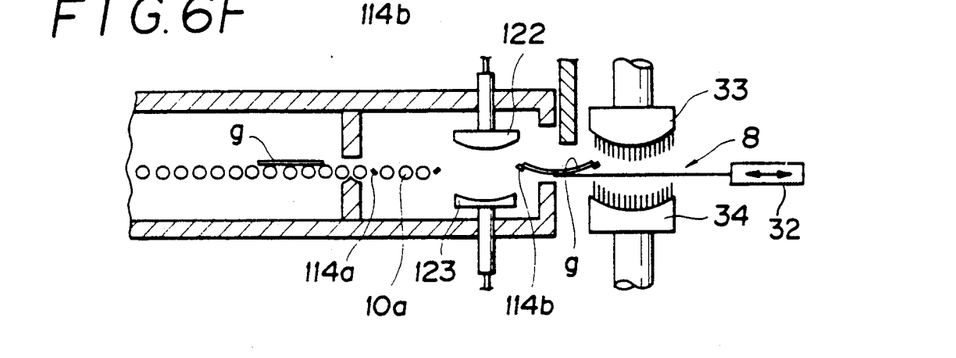

Then, as illustrated in FIG. 6F, the rollers 10a are elevated to a position higher than the upper surface of the first ring mold 114a in the transfer zone 2. Simultaneously, the glass sheet g is released from the upper mold 122 and placed onto the second ring mold 114b. Thereafter, the shutter 31 is temporarily opened, and the second ring mold 114b is moved by the feed mechanism into a position between the boxes 33, 34 in the quenching zone 8, as shown in FIG. 6A.

As shown in FIG. 6A, air is ejected from the nozzles 35, 36 on the boxes 33, 34 and applied to the glass sheet g to temper the same. The glass sheet g is cooled until the process progresses to the condition shown in FIG. 6C, after which the glass sheet g is delivered into the second cooling zone 9 in which the glass sheet g is cooled.

Figure 7:
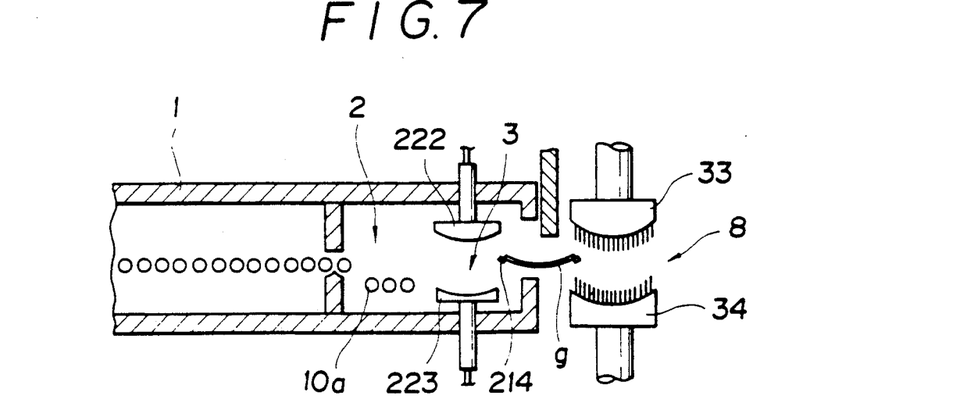
FIG. 7 is a fragmentary cross-sectional view of a modified ring mold used in a quenching zone in the glass sheet bending apparatus.

FIG. 7 shows a modification of the glass sheet bending apparatus 50.

The modified arrangement employs a single ring mold 214 instead of the two ring molds 114a, 114b shown in FIGS. 6A through 6F. The glass sheet g is fed by the single ring mold 214 from the transfer zone 2 through the shaping zone 3 to the quenching zone 8. A feed mechanism as hereinabove described for movement of a second ring 114b may be used to move the single ring mold 214. An upper mold 222 has no holes for attracting the glass sheet g under suction since the upper mold 222 is not required to attract the shaped glass sheet g. A lower mold 223 is identical in construction to the lower mold 123, and has its entire upper surface region used as a shaping surface.

In the glass sheet bending apparatus 50, the glass sheet pair G or the glass sheet g is moved horizontally from the transfer zone 2 to the shaping zone 3 in the heating furnace 1 by means of the ring mold 14 or the ring molds 114a, 114b, or the ring mold 214. The glass sheet pair G is also moved from the shaping zone 3 to the terminal end of the lehr 4 by the ring mold 14. The glass sheet g is also moved from the shaping zone 3 to the zone 8, 9 by means of the ring molds 114a, 114b or the ring mold 214. Therefore, the lower molds 23, 123, 223 are not required to have roller pockets. As a result, the entire surface regions of the shaping molds 22, 23, 122, 123, 222, 223 are used to shape the glass sheets G, g without leaving undesirable marks thereon.

The transfer zone 2 and the shaping zone 3 are disposed in the heating furnace 1. Therefore, the glass sheets G, g can be shaped while they are kept at around the glass softening point. Even if the glass sheets G, g are to be shaped to a deep and complex configuration, the glass sheets G, g can easily and accurately be bent to the desired shape. The glass sheets G, g can thus be shaped because the shaping molds 22, 23, 122, 123, 222, 223 are made of a heat resistant material which can easily be machined, as described above.

The shaping zone 3 is positioned contiguously and closely to the transfer zone 2. Thus, the time required until the glass sheets G, g are transferred onto the ring mold and shaped is short. As a consequence, before the glass sheets G, g sag due to gravity, they are delivered into the shaping zone 3 without allowing their temperature to drop. This is effective in easily and accurately bending the glass sheets G, g to shape. The sagging of the glass sheets G, g due to gravity can be utilized to pre-shape the glass sheets G, g.

The structure of each of the transfer zone 2 and the shaping zone 3 is simplified as these zones are individually positioned.

To shape a laminated glass sheet, a pair of glass sheets G placed one on the other is shaped and the shaped glass sheet pair G is annealed while it is being placed on the ring mold 14. Therefore, the glass sheets of the glass sheet pair G remain closely held against each other while the glass sheet pair G is being delivered from the heating furnace 1 to the pick-up station 5. As a result, even if the shaped glass sheet pair G has a relatively complex configuration, the glass sheets of the produced laminated glass sheet are well paired.

Since the glass sheet bending apparatus 50 has both the laminated glass sheet shaping section 1, 2, 3, 4, 5, 6, 7 and the tempered glass sheet shaping section 1, 2, 3, 8, 9, the single glass sheet bending apparatus 50 can selectively produce a laminated glass sheet and a tempered glass sheet.

When the temperature of the glass sheet pair G is lowered to the temperature at which the configuration and residual stresses of the glass sheet pair G are determined, the glass sheet pair G may be removed from the ring mold 14 and fed by rollers or the like. With this arrangement, the number of ring molds 14 used can be minimized.

Depending on the shape to which a laminated glass sheet is to be bent, the lower mold 23 may be dispensed with, and the glass sheet pair G may be shaped by only the ring mold 14 and the upper mold 22.

Although there have been described what are at present considered to be the preferred embodiments of the present invention, it will be understood that the invention may be embodied in other specific forms without departing from the essential characteristics thereof. The present embodiments are therefore to be considered in al aspects as illustrative, and not restrictive. The scope of the invention is indicated by the appended claims rather than by the foregoing description.

What is claimed is:

1. An apparatus for bending a glass sheet, comprising:
   a heating means defining a heating zone for heating the glass sheet;
   a shaping means defining a shaping zone for shaping the glass sheet;
   a cooling means defining a cooling zone for cooling the glass sheet; and a transfer means defining a transfer zone disposed immediately before said shaping zone in a direction in which the glass sheet is fed;
first feed means extending from said heating zone to said transfer zone for feeding the glass sheet from said heating zone to said transfer zone;
second feed means movable between said transfer zone, said shaping zone, and said cooling zone for moving the glass sheet between said transfer zone, said shaping zone and said cooling zone;
the glass sheet being transferred from said first feed means to said second feed means in said transfer zone; and
said second feed means comprising ring mold means for supporting the glass sheet from below,
wherein said cooling means has a lehr section and a quenching section which are selectively usable.

2. An apparatus according to claim 1, wherein said heating means, said transfer means, and said shaping means are disposed in a furnace.

3. An apparatus according to claim 1, wherein said first feed means comprises fixed rollers;
said transfer means comprising movable rollers being vertically movable in said transfer zone between an upper position in which the movable rollers receive the glass sheet from said fixed rollers and a lower position in which the movable rollers transfer the glass sheet onto said ring mold means.

4. An apparatus according to claim 1, wherein said ring mold means comprises a plurality of moving ring molds circulating through said transfer zone, said shaping zone, and said cooling zone.

5. An apparatus according to claim 1, wherein said quenching section has a quenching device for quenching the glass sheet;
said ring mold means comprising a first ring mold reciprocally movable between said transfer zone and said shaping zone, and a second ring mold reciprocally movable between said shaping zone and said quenching section.

6. An apparatus for bending a glass sheet, comprising:
a heating furnace for heating the glass sheet;
shaping means defining a shaping zone in said furnace for bending the heated glass sheet;
transfer means defining a transfer zone disposed immediately before said shaping zone;
a lehr extending from said shaping zone out of said heating furnace;
a moving ring mold for supporting the glass sheet from below, said ring mold circulating through said transfer zone, said shaping zone, and said lehr;
said glass sheet being transferred to said moving ring mold in said transfer zone;
quenching means defining a quenching zone,
a first feed line extending from said shaping zone to said lehr, and
a second feed line extending from said shaping zone to said quenching zone.

7. An apparatus for bending a glass sheet, comprising:
a heating furnace for heating the glass sheet;
a first feed mechanism for feeding the glass sheet horizontally in said heating furnace;
shaping means defining a shaping zone for shaping the glass sheet, said shaping zone being disposed downstream of said heating furnace in a direction in which the glass sheet is fed;
transfer means defining a transfer zone disposed immediately before said shaping zone in said heating furnace for receiving the glass sheet from said first feed mechanism;
a ring mold for receiving the glass sheet from said transfer means in said transfer zone;
a second feed mechanism for feeding said ring mold with the glass sheet supported thereon from said transfer zone to said shaping zone;
said shaping means comprising upper and lower molds in said shaping zone, said upper and lower molds operative for bending the glass sheet which is supported on said ring mold; and
means defining a cooling zone for cooling the glass sheet shaped in said shaping zone, said cooling zone being disposed outside of said heating furnace contiguously to said shaping zone
and comprising a lehr and a quenching section branching from said shaping zone and being selectively usable.

8. An apparatus according to claim 7, wherein the glass sheet comprises a laminated glass sheet constructed of two sheets of glass;
said ring mold supporting the laminated glass sheet horizontally which has been shaped in said shaping zone;
said apparatus further comprising:
a third feed mechanism for feeding said ring mold with the glass sheet supported thereon to said cooling zone.

9. An apparatus according to claim 8, further including:
pick up means including a pick-up station for picking up the annealed laminated glass, said pick-up station being disposed immediately following a downstream end of said lehr;
a ring mold return passage interconnecting said pick-up station and said transfer zone; and
a fourth feed mechanism for feeding the ring mold, from which the glass sheet has been picked up in said pickup station, to said transfer zone through said ring mold return passage;
said ring mold circulating through said transfer zone, said shaping zone, said said lehr.

10. An apparatus according to claim 7, wherein said quenching section comprises quenching means for tempering said glass sheet shaped in said shaping zone; and
said ring mold is reciprocally movable between at least said transfer zone and said shaping zone by said second feed mechanism.

11. An apparatus according to claim 10, wherein said upper mold in said shaping zone is a vacuum mold operable to attract the glass sheet under suction; said apparatus further including another ring mold for receiving the glass sheet shaped in said shaping zone from said upper mold, and another feed mechanism for reciprocally moving said another ring mold between said shaping zone and said quenching section.

12. An apparatus according to claim 10, wherein said ring mold is reciprocally movable between said transfer zone, said shaping zone, and said quenching section by said second feed mechanism.

13. An apparatus according to claim 7, wherein said first feed mechanism comprises:
a plurality of feed rollers for feeding said glass sheet in said heating furnace; and said transfer means comprises:
movable rollers vertically movable between an upper position in which the rollers receive the glass sheet from said feed rollers, and a lower position in which the rollers transfer the glass sheet onto said ring mold.

14. An apparatus according to claim 7, wherein each of said upper mold and said lower mold is made of a heat resistant material.

15. An apparatus according to claim 14, wherein said material is selected from the group consisting of aluminous cement, calcium silicate, and fused silica.

* * * * *